2 Sheets, Sheet 1.

W. B. Reaney,
Elevator.

No. 95,837. Patented Oct. 12, 1869.

Witnesses:
Wm. A. Steel
Jno. B. Harding

W. B. Reaney
by his Atty.
J. H. Howson

W. B. Reaney,
Elevator.

No. 95,837.  Patented Oct. 12, 1869.

Witnesses:
Wm. A. Steel
Jno. B. Harding.

W. B. Reaney
by his Atty
H. Howson

United States Patent Office.

W. B. REANEY, OF CHESTER, PENNSYLVANIA.

Letters Patent No. 95,837, dated October 12, 1869.

---

IMPROVEMENT IN HOISTING-APPARATUS.

---

The Schedule referred to in these Letters Patent and making part of the same.

---

*To all whom it may concern:*

Be it known that I, W. B. REANEY, of Chester, Delaware county, Pennsylvania, have invented an Improved Hoisting-Apparatus; and I do hereby declare the following to be a full, clear, and exact description of the same.

My invention consists of certain hoisting-apparatus, which is fully described hereafter, and which, although applicable to other purposes, is of especial advantage when employed for unloading vessels.

In order to enable others skilled in the art to make and use my invention, I will now proceed to describe its construction and operation, reference being had to the accompanying drawing, which forms a part of this specification, and in which—

Figure 1:
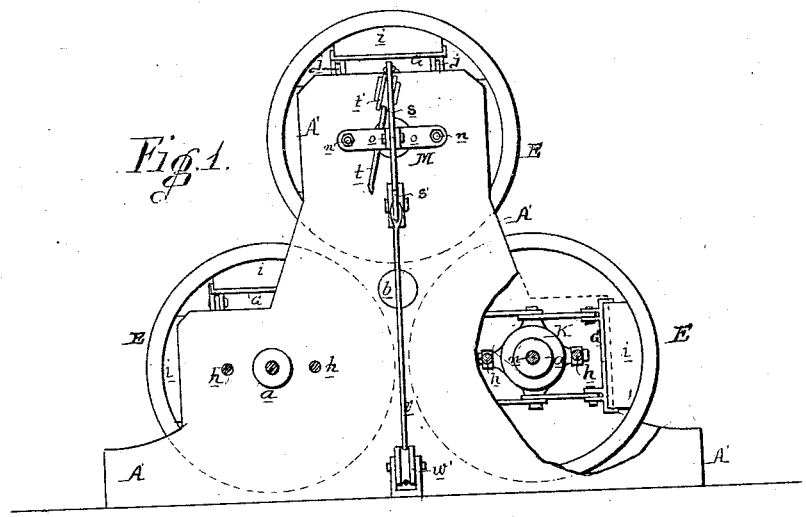
Figure 2:
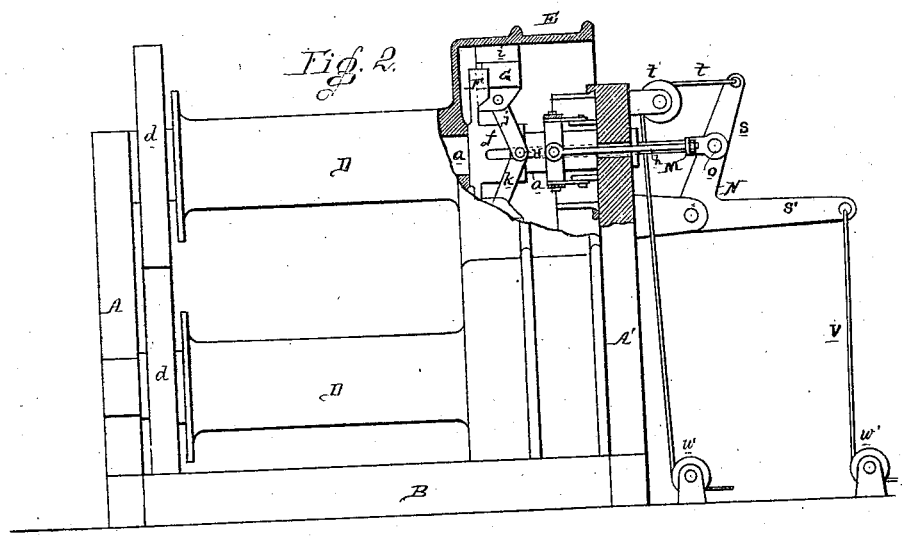
Figure 3:
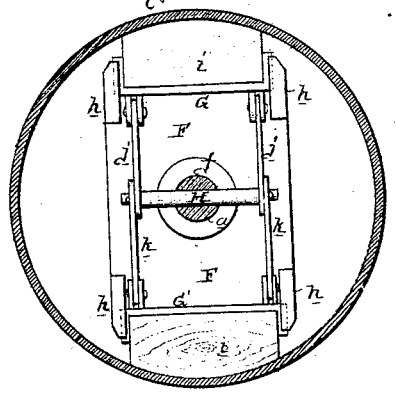
Figure 4:
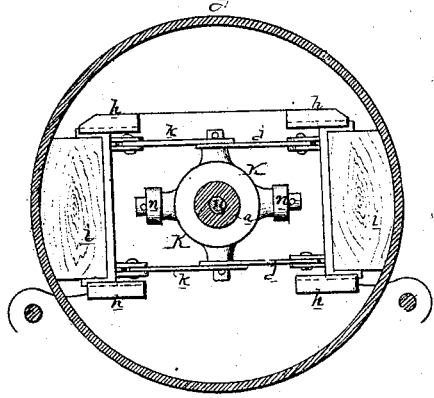
Figure 5:
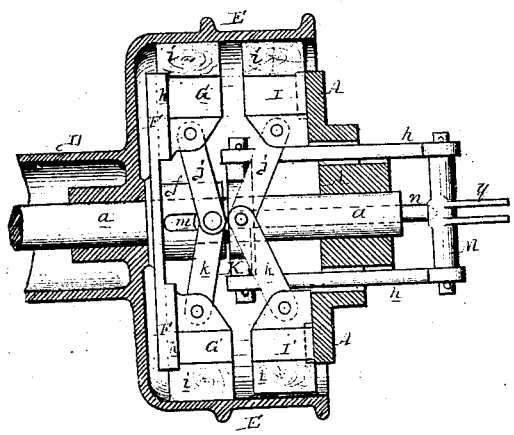
Figure 6:
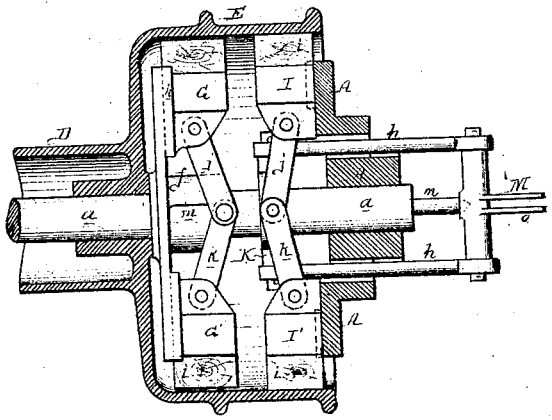

Figure 1, sheet 1, is a view of the front end of my improved hoisting-apparatus;

Figure 2, a side view of the same;

Figures 3 and 4, sheet 2, end views of the hoisting-barrels, showing the braking-apparatus; and Figures 5 and 6, longitudinal sections of the enlarged ends of the hoisting-barrels with braking-apparatus.

Similar letters refer to similar parts throughout the several views.

On reference to figs. 1 and 2, A and A' are the opposite frames of the hoisting-apparatus, and B, the foundation of the same.

In the opposite frames turn the shafts $a$ of the hoisting-barrels D, three of which are shown in the present instance, one above and two below, and the three being arranged at equal distances apart from each other, so that a pinion on a central driving-shaft, at $b$, will gear into a cog-wheel, $d$, with which each barrel-shaft $a$ is furnished.

It should be understood, however, that although I have shown three hoisting-barrels on one frame, a single barrel only, or more than three barrels may be used, and that whatever may be the number of barrels, each must be furnished with a duplex braking-apparatus, which I will now proceed to describe, and which will be best understood by reference to the enlarged views in sheet 2.

The barrel D is always loose on its shaft $a$, excepting when the braking-mechanism is applied as described hereafter.

A hollow cylindrical enlargement, E, is formed on the end of each barrel, and to the inner surface of this enlargement are applied the brakes.

Two distinct brakes are employed, one of which consists of a plate, F, the hub $f$ of which is secured to the shaft $a$, and on this plate are guides $h\,h$ for the two sockets G and G', in each of which is fitted a block or rubber, $i$, of wood or other suitable material, and the outer surface of each block is rounded to accord with the interior of the cylindrical enlargement E of the hoisting-barrel.

Two links $j\,j$ are jointed at one end to the socket G, and two similar links $k\,k$ to the socket G', and the whole of the links are jointed to a pin, H, and this pin passes through an elongated opening, $m$, in the hub $f$ of the plate, and on the shaft $a$, which, from this point to its outer end, is made tubular for the reception of a pin, $n$. When this pin is pushed inward, in the manner described hereafter, it will bear against the pin H, and through the medium of the levers $j$ and $k$, which form a knee-joint, will force the two rubbers outward and against the interior of the enlargement E of the barrel, in which case, as the braking-device revolves with the shaft, the latter controls the barrel.

When the pin $n$, however, is relieved from this inward pressure, the barrel is also relieved from the action of the rubbers, and is free from the control of the shaft $a$, and is at liberty to revolve independently of the same.

The other braking-apparatus has also sockets I I', for receiving blocks or rubbers, but these sockets, instead of revolving with the shaft, as in the former instance, are arranged to slide in guides formed on the stationary frame A of the hoisting-apparatus, and these sockets are connected by links, forming a knee-joint, to a cross-head, K, in which the shaft A can turn freely.

The cross-head is connected, by links $p\,p$, to a cross-piece, M, on which are projections $q\,q$ for receiving the operating-lever.

On forcing the cross-piece M inward, it will, by bearing against the pin $n$, force the sockets G G' outward, thereby placing the barrel under the control of the shaft $a$, but on moving the cross-piece outward, the pressure against the pin $n$ will be removed, and the barrel will be free from the control of the shaft.

On continuing to move the cross-piece M outward, the sockets I I, with their rubbers, will, through the medium of the links $p\,p$, cross-head K, and knee-joint links, be moved apart, and their rubbers brought to bear against the enlargement of the barrel, the movement of which must be retarded or stopped.

It will now be seen that there are two distinct brakes: first, that secured to and revolving with the shaft $a$, and put in operation by pressure against the pin $n$; and second, that which is free from the control of the shaft, and which is actuated by the outward movement of the cross-piece M.

The first device may be termed the hoisting and releasing-brake, and the second, the retarding and stopping-brake. It should be understood that when the hoisting-apparatus is in action, the shaft $a$ revolves continuously in one direction, and in this consists the most important advantage of my invention, as will appear hereafter.

The utility of the hoisting-apparatus will be most apparent when we view it as applied to the unloading of a vessel, to the deck of which the apparatus is secured. One end of a rope is secured to the barrel, passed through a block on a swinging boom over the hatchway, the other end of the rope having a bucket or other vessel for receiving a portion of the cargo, if the latter be of coal, grain, or other granular material; or if the cargo consists of bulky objects, the rope is furnished with suitable appliances for seizing the same.

The shaft $a$ being driven by a small adjacent engine, an attendant, by simply operating the cross-piece M, so as to relieve the pin $n$ from pressure, releases the barrel from the control of the shaft, and consequently the bucket will descend into the hold, but the attendant arrests it at the proper point in its descent by moving the cross-piece M further outward, and thereby bringing the retarding and stopping-brake into action. After the bucket has received its load, the attendant moves the cross-piece M inward, thereby placing the barrel under the control of the revolving shaft, and causing it to wind up the rope. When the proper height has been reached, the boom is swung round over the point where the load is to be discharged, and the barrel is again placed beyond the control of the shaft, and so on.

All these operations are performed while the shaft continues to revolve in one direction, and by the simple movement of the cross-bar M; hence all reversing-gear, which is more or less objectionable on account of its complexity and the tedious manipulation which it demands, is dispensed with.

Many different appliances may be employed for operating the cross-piece M, but I prefer the plan illustrated in figs. 1 and 2, where N represents a bell-crank lever, hung to a projection on the frame A' of the apparatus.

To the arm $s$ of this lever is connected the said cross-piece M, and to the same arm is connected one end of a cord or chain, $t$, passing over a pulley, $t'$, and round a pulley, $u$, another cord or chain, $v$, is secured to the arm $s'$ of the lever, and this passes round a pulley, $w'$, on deck. The two cords or chains may be carried to any point where it is most advantageous for the operator to station himself, so that he can observe the results of his operations, and note the signals of those in the hold of the vessel.

It will be readily understood how, by pulling one or other of these cords or chains, the above-described brakes may be operated in the manner described.

If three barrels be used, as shown in figs. 1 and 2, each barrel having its own braking-apparatus, and cords or chains for operating the same, the cords may all terminate at the point where the operator is situated, so that he may have the control of three barrels.

It will be evident, without further description, that by the aid of my above-described hoisting-apparatus the cargo of a vessel may be removed with much greater rapidity than by the appliances heretofore used for the purpose.

I do not desire to confine myself to the precise construction of the several parts illustrated and described, as they may be varied without departing from the main features of my invention; but

I claim, and desire to secure by Letters Patent—

1. A hoisting-machine, in which are combined the following elements, namely: first, a shaft, to be revolved continuously in one direction; second, a barrel, loose on the said shaft; third, a braking-device, revolving with the shaft, and arranged to control the barrel, or release the same; and fourth, a braking-device for retarding and stopping the barrel, all arranged substantially as set forth.

2. The plate F, secured to the shaft $a$, and carrying the sliding sockets G G', in combination with the links $j$ and $k$, connected together by a rod, H, passing through a slot in the shaft, and with a rod, $n$, passing through the shaft, all substantially as described.

3. The rod $n$, connected to the inner braking-device, and the rods $h$, connected to the outer braking-device, in combination with the cross-piece M, for the purpose described.

4. The combination of the braking-device herein described, the cross-piece M, and the lever N, for the purpose set forth.

In testimony whereof, I have signed my name to this specification, in the presence of two subscribing witnesses.

W. B. REANEY.

Witnesses:
 W. WARD,
 SAMUEL ULRICH.